(12) United States Patent
Ekhoff

(10) Patent No.: US 8,074,239 B2
(45) Date of Patent: Dec. 6, 2011

(54) AXIAL FORCE SPINDLE CLAMP

(76) Inventor: Donald L. Ekhoff, Post Falls, ID (US)

( * ) Notice: Subject to any disclaimer, the term of this patent is extended or adjusted under 35 U.S.C. 154(b) by 322 days.

(21) Appl. No.: 12/505,896

(22) Filed: Jul. 20, 2009

(65) Prior Publication Data

US 2011/0016478 A1   Jan. 20, 2011

(51) Int. Cl.
*G11B 17/03* (2006.01)
(52) U.S. Cl. ...................................................... 720/706
(58) Field of Classification Search .................. 720/622, 720/713, 704, 619, 715, 655, 610, 690, 624, 720/652, 604, 702, 696, 712, 706, 707
See application file for complete search history.

(56) References Cited

U.S. PATENT DOCUMENTS

| | | | |
|---|---|---|---|
| 5,048,005 A | 9/1991 | Ekhoff | |
| 5,560,624 A | 10/1996 | Williams et al. | |
| 6,836,461 B2 | 12/2004 | Baum et al. | |
| 7,216,355 B2* | 5/2007 | Kim et al. | 720/706 |
| 7,343,610 B2* | 3/2008 | Shibata | 720/713 |
| 7,478,412 B2* | 1/2009 | Huh et al. | 720/706 |
| 2004/0244024 A1* | 12/2004 | Horng et al. | 720/706 |
| 2004/0244025 A1* | 12/2004 | Horng et al. | 720/706 |
| 2006/0031866 A1* | 2/2006 | Kim et al. | 720/706 |
| 2007/0199010 A1* | 8/2007 | Chen | 720/706 |
| 2010/0242058 A1* | 9/2010 | Yoon | 720/706 |

* cited by examiner

*Primary Examiner* — Allen Cao
(74) *Attorney, Agent, or Firm* — Schneck & Schneck

(57) ABSTRACT

A spindle clamp for supporting a disk includes a radial control member that is in contact with an opening through a jaw and that has a contour such that radial expansion of the jaw is induced during initial movement of the jaw toward a registration surface for seating the disk. However, the contour is such that further movement of the jaw toward the registration surface is an axial motion, rather than a combination of axial and radial motion. In one preferred embodiment, the jaw is unitary, but is configured to enable the radial expansion while having sufficient rigidity to reliably clamp a data disk seating on the registration surface. The jaw may include a lip which is configured to contact the major surface of the disk opposite to its contact with the registration surface.

18 Claims, 6 Drawing Sheets

AXIAL FORCE SPINDLE CLAMP

TECHNICAL FIELD

The invention relates generally to spindle clamps for supporting and releasing a data disk and more particularly to securing a rigid disk for rotation about an axis.

BACKGROUND ART

Magnetic and optical data disks are used to store a large quantity of data. The information is stored on at least one major planar surface of the disk, allowing the information to be accessed when the disk is secured to a spindle clamp for high-speed rotation of the disk. Spindle clamps are also referred to as "disk clamps" and "disk chucks."

In the quality control testing as well as the manufacturing of magnetic and optical data disks, rapid robotic removal of a tested disk from a spindle is followed by replacement with a disk to be tested or processed. A suitable spindle is described in U.S. Pat. No. 4,755,981 to Ekhoff. The spindle clamp of Ekhoff includes movable jaw segments which slide along a centrally positioned cone to expand the arrangement of jaw segments when a disk is to be clamped and to contract the arrangement when a disk is to be released. Thus, a collet-type mechanism is used to secure the disk at its central opening. The function of the spindle clamp is to secure the disk in a tightly concentric manner, while introducing minimal distortion or waviness to the precision planar surfaces of the disk. Because of the high volume of disks involved and the short period of processing time, it is important that this clamping/unclamping function occurs reliably and without any required secondary actions, such as attaching a removable cap with a screw. In the device described in the Ekhoff patent, the primary holding force is applied to the disk in a radial fashion as the three jaw segments slide downwardly along the cone under the influence of a spring located on the underside of the clamp. The movement of the jaw segments along the cone is controlled by connection to a cap, which consists of an axially extending post having an upper head. The stroke motion is applied to the post either pneumatically or mechanically. Slippage of the disk is controlled by the force that is applied as the jaw segments are wedged between the inside circumference of the disk and the cone along which the jaw segments slide.

The ability of a spindle clamp to secure a storage disk is limited by the processing tolerance to distortion introduced into the disk, as well as by the point of slippage of the jaw segments against the inner cone. This point of slippage is primarily affected by the level of lubrication which is introduced in order to control particle generation that would occur through wear processes. Another concern is that spindle clamps used in quality control and other such processing should be designed to handle disks with different configurations and thicknesses, without introducing distortions due to variations in contact between the jaw and the disk inside diameter and the resulting load concentrations.

SUMMARY OF THE INVENTION

A spindle clamp for supporting a disk in accordance with the invention includes a radial control member in contact with an axial opening of a jaw, with the radial control member having a contour such that radial expansion of the jaw is induced during initial movement of the jaw toward a registration surface for seating the disk, but further radial expansion is avoided in a final portion of the movement toward the registration surface. In one preferred embodiment, the jaw is "unitary," but enables radial expansion while having sufficient rigidity to reliably clamp a data disk, such as a conventional magnetic or optical disk. While the jaw is unitary, it may be comprised of a number of portions which are connected to allow the radial expansion. As used herein, the term "unitary" is defined as designating a one-piece structure. Also in one preferred embodiment, the jaw includes a lip which is configured to contact the major planar surface of the disk opposite to the contact with the registration surface, thereby clamping the disk.

The jaw may be connected to a cap which is dimensioned to guide the disk into the desired orientation on the registration surface. The cap is coaxial to the unitary jaw and may include an axially symmetric arrangement of fingers. Thus, the spindle clamp may operate in either a vertical or horizontal spin axis. In an application having a vertical spin axis, the arrangement of fingers and gravitational force cooperate to ensure that the disk is in a desired orientation on the registration surface. On the other hand, in an application utilizing a horizontal spin axis, the compound motion of the jaw cooperates with the arrangement of fingers upon which the disk inside diameter rests. The unitary jaw includes slots which are aligned with the fingers to allow the jaw to expand and contract radially between a dimension exceeding a comparable dimension of the fingers and a dimension less than that of the fingers.

In order to control potential generation of particles which may adversely affect the data disk, the jaw is preferably formed of a hard plastic material, such as the engineering plastic PEEK (Polyaryletheretherketone). By forming the jaw as an integral structure capable of expanding radially but remaining rigid, dimensional stability is maintained in the radial and axial directions. The individual working elements of the jaw cannot be taken out of sequence or otherwise compromised. In a preferred embodiment, an elastomeric O-ring acts to bias the jaw into its collapsed condition. This ensures that the axial opening of the jaw remains in contact with the radial control member.

In one preferred embodiment of the radial control member, its contour transitions from a conical surface to a cylindrical surface. During a clamping operation, the conical surface controls the initial operation of the jaw, which moves both axially and radially. For embodiments that include the lip, the radial expansion of the jaw places the lip beyond the inside diameter of the disk. Prior to the lip reaching the surface of the disk, control of the operation of the jaw is transitioned to the cylindrical surface, such that the jaw moves only in an axial direction to a clamping position in which the disk is secured in position. The invention accommodates various disk thicknesses with various disk chamfer configurations along the inside diameter, without compromise in performance. Whether actuated pneumatically or mechanically, the disk-release operation causes the jaw to move initially in an axial direction until a dimension somewhat greater than the greatest anticipated disk thickness, whereafter the conical surface allows the jaw to retract inside the confines of the cap. Thus, a seated disk can be removed and a second disk may be installed for subsequent disk processing. The cap preferably has a smooth lead-in which facilitates the disk placement by automation to the guide fingers of the cap.

DETAILED DESCRIPTION

Figure 1:
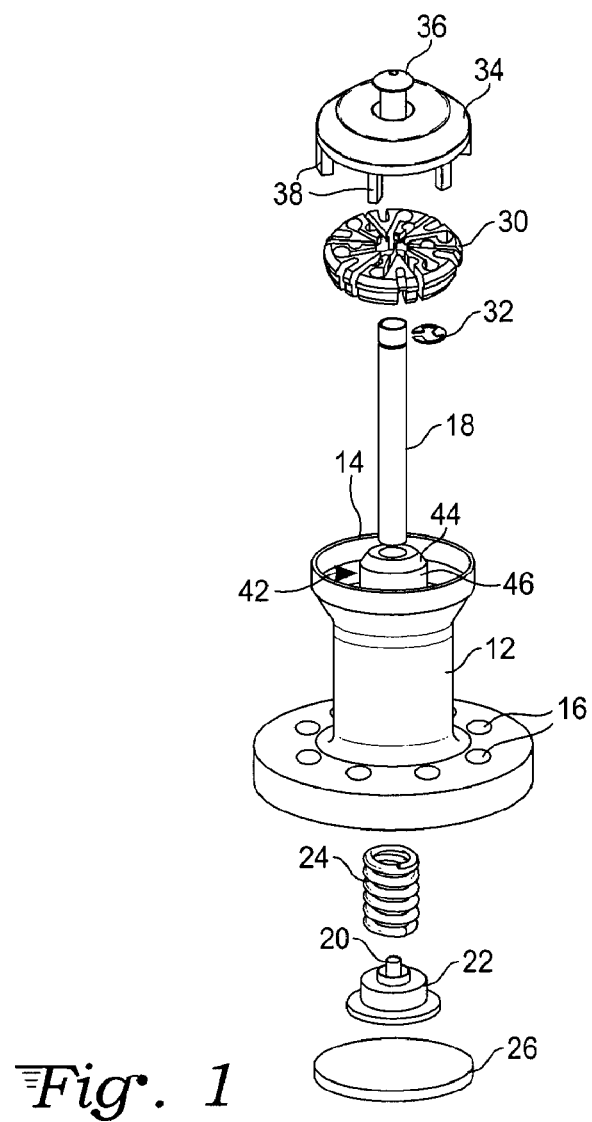
FIG. 1 is an exploded view of a spindle clamp in accordance with one embodiment of the invention.
Figure 2:
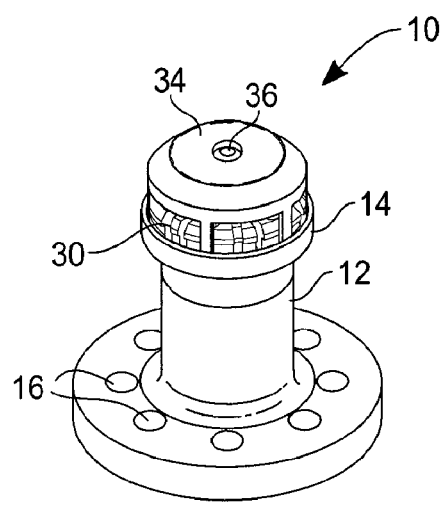
FIG. 2 is a perspective view of the assembled spindle clamp of FIG. 1.

With reference to FIGS. 1 and 2, one embodiment of spindle clamp 10 in accordance with the invention is shown as including a rotational clamp body 12 having an upper registration surface 14 for seating a data disk. The clamp body may be mounted to an air-bearing spindle using the standard technique of inserting screws into an arrangement of screw holes 16. The bottom of a clamp body is perpendicular to the axis of rotation of the air-bearing spindle and is accurate to at least 0.25 micron.

The lower portion of the clamp body 12 is formed of a metal, typically stainless steel or aluminum to which is attached a ceramic carbide portion that includes the registration surface 14. The ceramic carbide registration surface is ground parallel to the bottom surface of the clamp body to within 0.25 micron, so as to control any possibility of axial run out of the disk while being processed.

Figure 3:
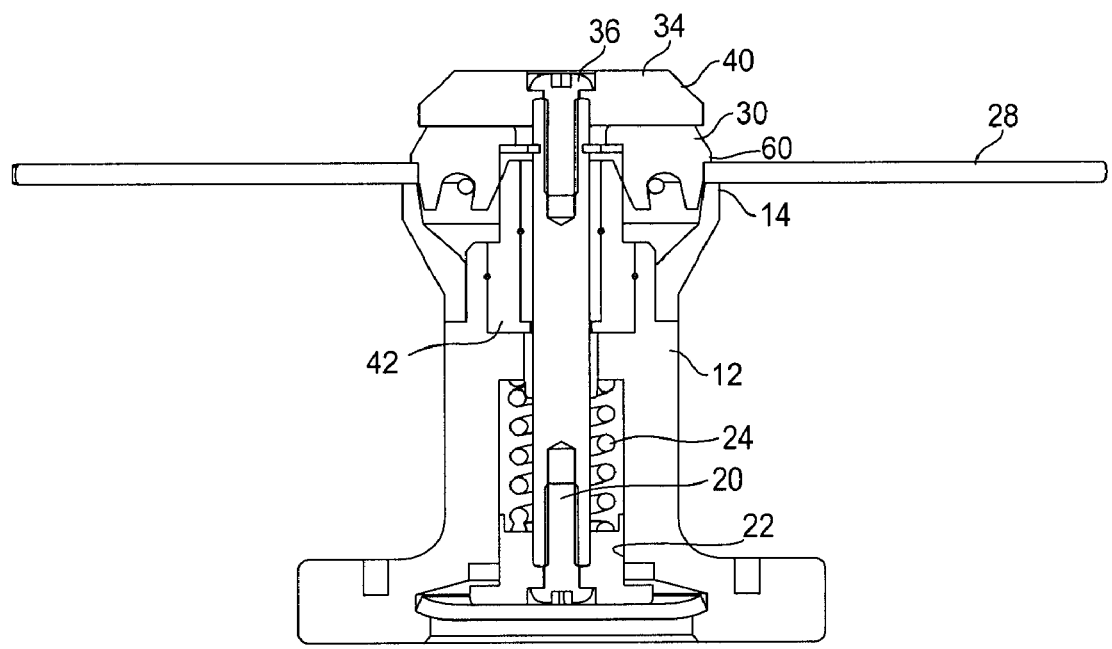
FIG. 3 is a side cutaway view of the spindle clamp of FIG. 1 shown in a clamped position.

Extending through the clamp body 12 is an axial shaft 18 which is internally threaded at both its upper end and its lower end. Referring now to FIGS. 1-3, at the lower end of the shaft, a screw 20 passes through a piston 22 and is threaded into the shaft. The piston is biased downwardly into the position shown in FIG. 3 by a spring 24. The piston acts as a spring carrier and locator, so that the spring exerts downward force sufficient to physically clamp a disk 28 against the registration surface 14.

While the shaft 18 is biased by the spring 24 in the downward direction as viewed in FIGS. 1-3, the bias can be overcome by activation of a rubber diaphragm 26. Thus, the piston may be manipulated pneumatically. Pressure applied by the diaphragm acts directly on the piston 22. The piston is pushed upwardly (FIG. 4) into dimensionally corresponding grooves within the interior of the clamp body to release the disk and allow insertion of a second disk before the diaphragm is deactivated. At the upper end of the axial shaft 18, a unitary jaw 30 is captured between a C-clip 32 and a cap 34. A screw 36 secures the cap and jaw to the shaft. Thus, manipulation of the piston 22 at the bottom end of the shaft moves the jaw and cap upwardly and downwardly. While the manipulation of the piston is described as being pneumatic, mechanical approaches may be substituted without diverging from the invention.

As will be described in detail below, the cap 34 is a unitary member in at least one preferred embodiment, but nevertheless allows radial expansion and retraction. From the clamping position shown in FIG. 3, the upward movement of the various components relative to the clamp body 12 is not accompanied by radial expansion or contraction of the jaw. However, in a second stage of operation of the jaw, retraction occurs. After the shaft 18 has moved upwardly by a dimension to ensure that the jaw is further away from the registration surface 14 then a distance greater than the thickest anticipated disk, further upward movement of the shaft triggers a compound operation in which the jaw moves upwardly and retracts inwardly. Preferably, the inward retraction is such that the radial dimension of the jaw is no greater than that of downwardly depending fingers 38 (FIGS. 1, 8, and 9) of the cap 34. This allows the disk 28 to be removed and allows a substitute disk to be installed for disk processing.

The cap 34 includes a smooth lead-in surface 40 to facilitate disk placement by automation. Moreover, the combination of the fingers 38 is dimensioned to form a smooth guiding feature, so that the disk can be placed reliably on or near the registration surface 14, by a robot or other feed system. In the unclamped position of FIG. 4, two of the fingers 38 of the cap are represented in phantom. The outer surfaces of the fingers are curved and the curvatures are dimensioned both individually and collectively to smoothly contact the inside diameter of a disk 28 as the disk is seated into the position shown in FIG. 4.

The stages of operation of the jaw 30 are determined by the contour of a "radial control member" 42 that projects upwardly from the clamp body 12. As best seen in FIG. 1, this radial control member includes an upper truncated conical surface 44 and a lower cylindrical surface 46. With respect to both surfaces, the slope determines the radial expansion and retraction of the jaw 30, so that the cylindrical surface is associated with an absence of expansion or contraction of the jaw. While the cylindrical and sloped surfaces provide benefits relative to other configurations which dictate the compound motions of the jaw, other possibilities may be available.

Figure 4:
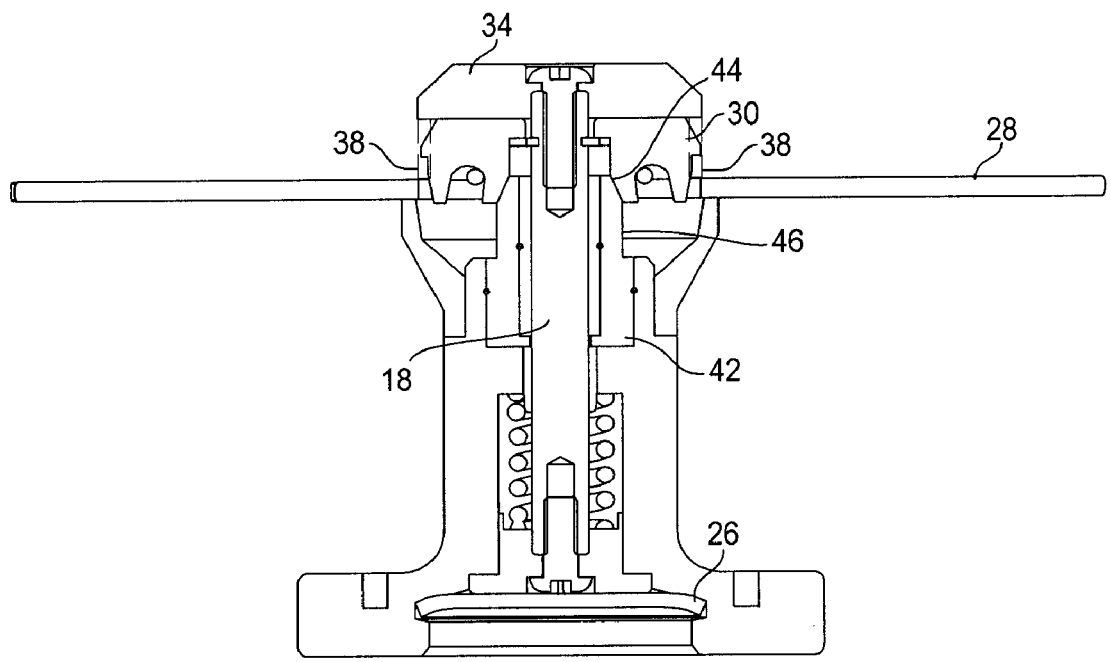
FIG. 4 is a side view of the spindle clamp of FIG. 3 shown in its unclamped position.

FIG. 3 is the clamping position of the jaw 30, since the jaw is fully lowered to the position in which contact is made with the disk. In comparison, FIG. 4 shows the unclamped position in which the disk is available for removal.

Figure 5:
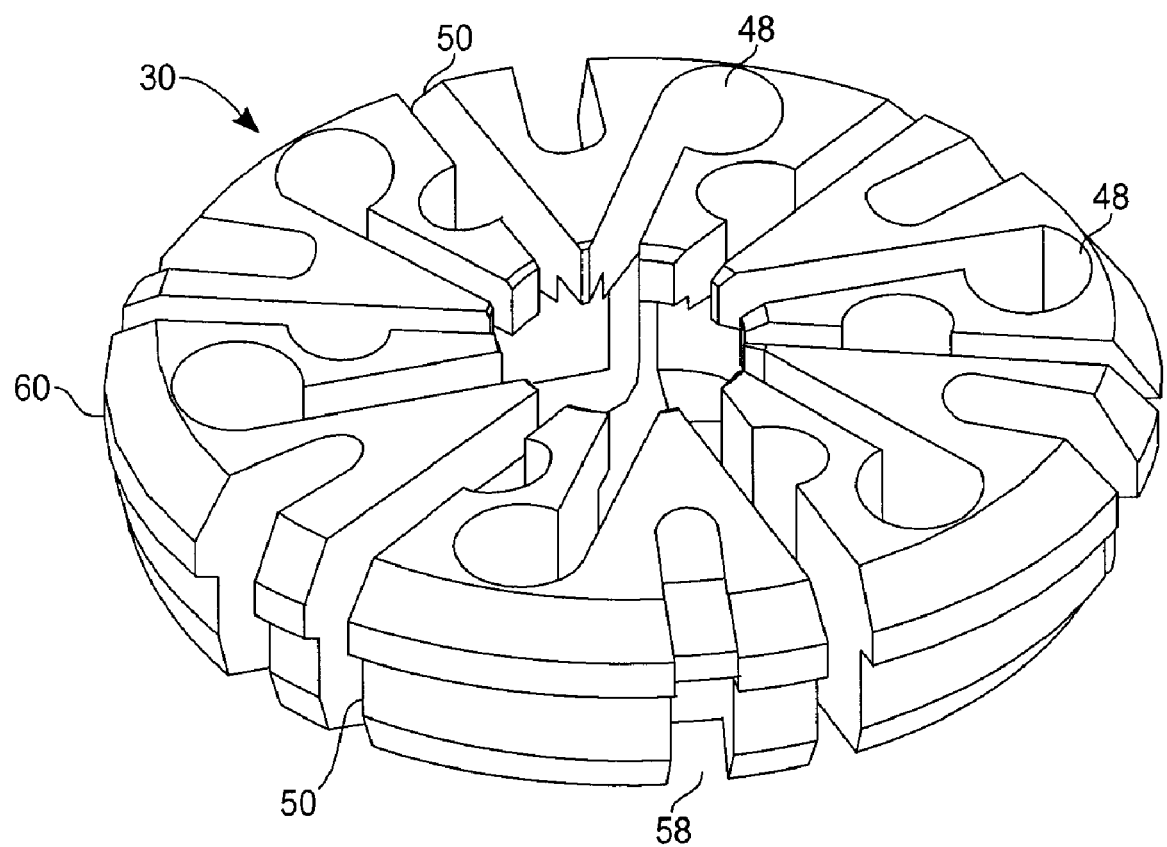
FIG. 5 is a perspective view of a unitary jaw in accordance with one embodiment of the invention.
Figure 6:
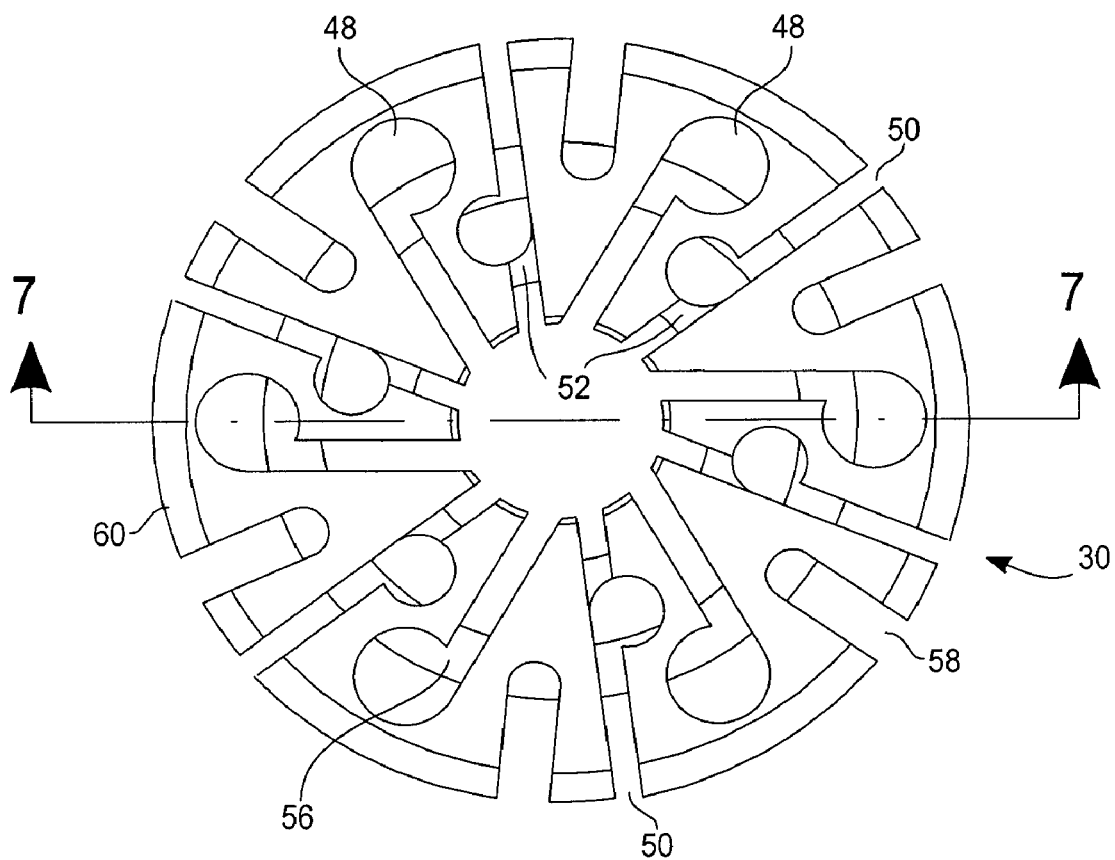
FIG. 6 is a top view of the unitary jaw of FIG. 5.
Figure 7:
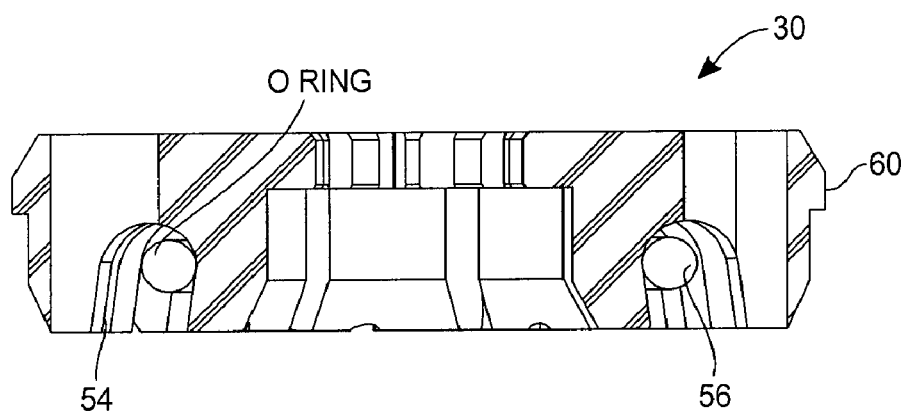
FIG. 7 is a sectional view of the jaw of FIG. 6, taken along lines 7-7.

One embodiment of the unitary jaw is shown in more detail in FIGS. 5, 6, and 7. The jaw is manufactured of a durable engineering plastic (such as PEEK) compatible with end-user process acceptability. While the jaw is cylindrical in nature, it is slotted in such a way that radial expansion and contraction are allowed. A first series of slots extend outwardly from the inside diameter of the jaw, but do not reach the outside diameter. In comparison, a second series of slots extend from the outside diameter, but flexible integral connections 52 maintain the single-piece integrity of the material. Furthermore, there is an angled slot 54 (FIG. 7) into which an elastomeric O-ring 56 is inserted, so as to act as a hoop spring. The use of the O-ring causes the jaw to collapse or reduce its outside diameter when the jaw is allowed to relax. In use, the radial size of the jaw is determined by its contact with the radial control member 42 of FIGS. 1, 3, and 4.

Figure 8:
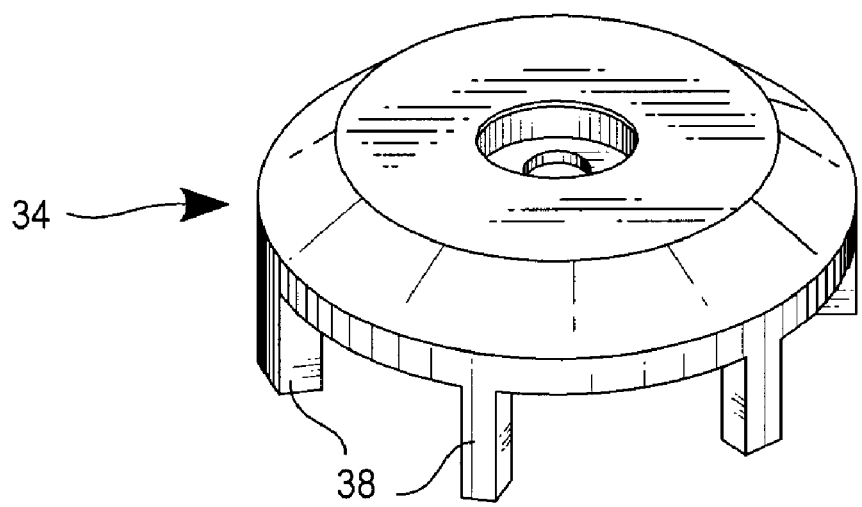
FIG. 8 is a perspective view of the cap of FIG. 1.
Figure 9:
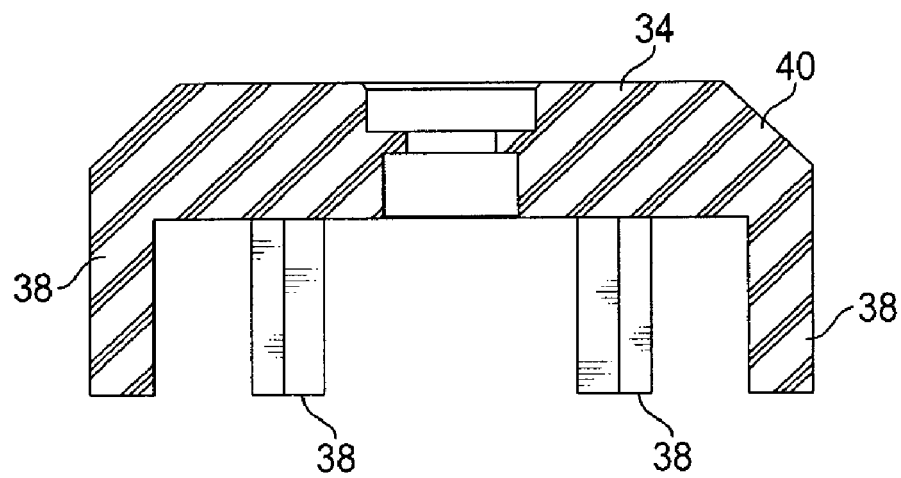
FIG. 9 is a sectional view of the cap of FIG. 8.

In addition to the first and second series of slots 48 and 50 of the jaw 30, there is a series of radial slots 58 extending from the outside diameter of the jaw to allow the passage of the fingers 38 of the cap 34 of FIGS. 8 and 9. The number of slots 58 corresponds to the number of fingers. In the illustrated embodiment, there are six slots and six fingers. The provision of these slots 58 allows the jaw to collapse to a state in which the radial dimension of the jaw does not exceed the radial dimension defined by the arrangement of fingers, so that the fingers may be used to guide disks onto and off the spindle clamp when the jaw is in its collapsed state.

Figure 10:
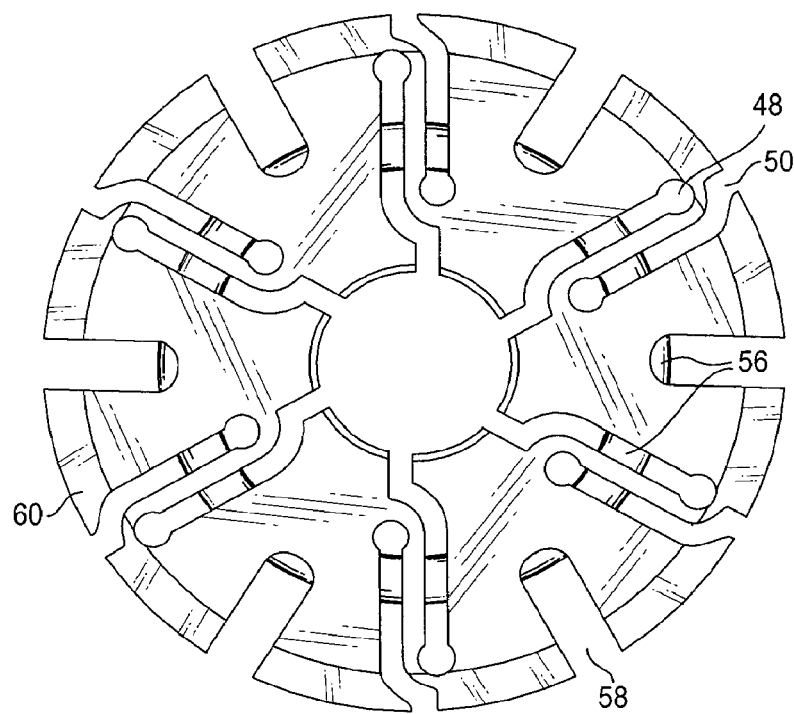
FIGS. 10 and 11 illustrate an alternative embodiment of a unitary jaw in accordance with the invention.
Figure 11:
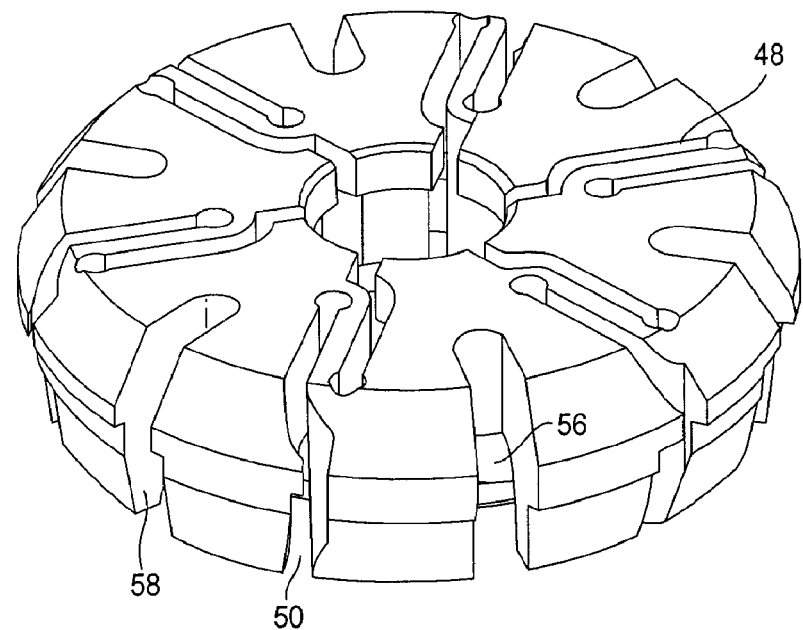

Another embodiment of the unitary jaw is shown in FIGS. 10 and 11. Again, an elastomeric O-ring 56 biases the jaw into its collapsed condition, but strategically located slots allow expansion and retraction. Functionally equivalent features of this embodiment and the previously described embodiment have shared reference numerals.

Another significant feature of the jaw 30 is the lip 60 which is best seen in FIG. 7. The function of the lip is to apply pressure to the surface of the disk being clamped. FIG. 3 shows the disk 28 captured between the lower surface of the lip 60 and the registration surface 14 of the clamp body 12. As the jaw 30 expands during the initial operation of downward movement of the jaw along a radial control member 42, the lip extends beyond the fingers of the cap 34. After the jaw reaches its transition position, the motion of the lip is purely axial until contact is made with the disk.

The cap 34 is best seen in FIGS. 1, 8, and 9. The cap is directly attached to the axial shaft 18 which is connected to the piston 22 so as to act in unison under the influence of either the spring 24 or pneumatic pressure applied via the diaphragm 26. The jaw 30 is sandwiched between the C-clip 32 and the underside of the cap 34. As a result of connection to the cap and the inclusion of the slots 58 that accommodate the fingers 38 of the cap, the jaw will move axially with the cap but is free to move radially. When the spindle clamp is in a clamping condition with respect to a disk, a pneumatic unclamp command causes the cap to move upwardly, causing the jaw to move axially. Initially, the jaw is in contact with the cylindrical surface 46, so that motion of the jaw is restricted to axial movement. After a minimal movement upward, equal or slightly greater than the distance necessary to accommodate the thickest disk anticipated to be clamped, the jaw reaches the transition position of FIG. 4 and starts to move inwardly as further axial movement occurs. When the outside diameter of the lip is less than the inside diameter of the disk, the disk can be removed.

A subsequent disk can then be inserted onto the spindle clamp 10. The lead-in surface 40 (FIG. 3) of the cap accommodates robotic placement of the disk. Additionally, the spacing of the fingers 38 and the curvature of each finger are designed to properly position the disk. The presence of the fingers is particularly significant where the spindle clamp is operated with the spin access other than a vertical spin access. For example, in a horizontal application, the disk inside diameter rests upon the curved surfaces of the fingers, so that the disk is properly positioned when the jaw is initiated into its compound motions. After the initial radial expansion, the final motion of the jaw is purely axial, allowing the lip 60 of the jaw to clamp the disk in position against the registration surface 14.

While selected embodiments of the axial force spindle clamp are illustrated, other embodiments are available. For example, the actuation of the motion may be mechanical rather than pneumatic. Also, the jaw 30 may be biased into a release condition, rather than the clamping position accomplished by the spring 24. The spindle clamp may be used with various data disks, including magnetic disks and optical disks.

What is claimed is:

1. A spindle clamp for supporting a disk comprising:
    a unitary jaw having an axial opening and having a geometry which includes structural features enabling radial expansion upon application of radial force applied along said axial opening, said unitary jaw having a lip configured to contact a first major surface of said disk;
    a registration surface located to contact a second major surface of said disk to position said disk in a desired orientation when said disk is captured between said lip and said registration surface; and
    a radial control member in contact with said axial opening of said unitary jaw to allow relative movement between said radial control member and said unitary jaw, said radial force control member having a contour such that said radial expansion of said unitary jaw is induced during a portion of movement of said lip toward said registration surface and such that further said radial expansion is avoided in a final portion of said movement of said lip toward said registration surface.

2. The spindle clamp of claim 1 further comprising a cap and a means for providing displacement of said cap relative to said radial control member, said unitary jaw being fixed to said cap, said cap being dimensioned to guide said disk into said desired orientation on said registration surface.

3. The spindle clamp of claim 2 wherein said cap includes a plurality of fingers extending parallel to an axis of said cap, said cap being co-axial to said unitary jaw, said fingers being positioned to provide guidance of said disk into said desired orientation.

4. The spindle clamp of claim 3 wherein said unitary jaw includes slots aligned with said fingers, said unitary jaw having a relaxed condition in which said unitary jaw extends radially by a distance not exceeding a radial extent of said cap, said radial expansion of said unitary jaw into an expanded condition being one in which said unitary jaw extends beyond said radial extent of said cap.

5. The spindle clamp of claim 4 further comprising an elastomeric ring within a groove of said unitary jaw to provide bias into said relaxed condition.

6. The spindle clamp of claim 4 wherein said contour of said radial control member is such that movement of said lip of said unitary jaw from contact with said disk maintains said unitary jaw in said expanded condition until a transition position in reached, whereafter said contour enables radial contraction.

7. The spindle clamp of claim 5 wherein said contour is one in which said transition position is established by a change between a cylindrical shape to a sloped shape of said radial control member.

8. The spindle clamp of claim 1 wherein said unitary jaw is formed of a hard plastic material.

9. The spindle clamp of claim 1 further comprising a drive means for controlling rotation of said registration surface and said unitary jaw.

10. A spindle clamp comprising:
    a clamp body having a registration surface for supporting a removable disk;
    a jaw having a plurality of portions arranged about a jaw axis to enable radial expansion, said jaw having a clamping position and having a release position in which said disk is released;
    a central structure along which said jaw moves during motion of said jaw relative to said registration surface, said central structure having a sloping region positioned to vary said radial expansion of said jaw when said jaw is moved along a first axial path portion distant from said clamping position, said central structure further having a constant dimension region positioned to maintain a constant said radial expansion of said jaw when said jaw is moved along a second axial path portion proximate to said clamping position; and
    a clamp device for displacing said jaw relative to said central structure so as to move said jaw along said first and second axial path portions.

11. The spindle clamp of claim 10 wherein said sloping region of said central structure is a portion of a conical surface and wherein said constant dimension region is a cylindrical surface.

12. The spindle clamp of claim 10 wherein said jaw is a unitary member having a lip positioned to contact said disk on a side opposite to said registration surface.

13. The spindle clamp of claim 10 further comprising a cap connected to said clamp drive and said jaw, said cap including a plurality of fingers which are perpendicular to said registration surface and which are symmetrically arranged to guide said disk to said registration surface.

14. The spindle clamp of claim 13 wherein said cap has a truncated conical surface to guide said disk to said fingers.

15. The spindle clamp of claim 13 wherein said jaw includes slots aligned to receive said fingers.

16. The spindle clamp of claim 10 wherein said clamp drive includes a spring which biases said jaw into said clamping position.

17. The spindle clamp of claim 10 further comprising an O-ring within said jaw to bias said portions of said jaw into a contracted condition.

18. A spindle clamp comprising:
a unitary jaw having interconnected jaw portions, each having a lip region;
a rotational clamp body having a registration surface for seating a disk;
a radial control member connected to said rotational clamp body, said radial control member passing through said unitary jaw, said radial control member having a conical region in which said unitary jaw expands in diameter with an initial approach of said lip regions toward said disk residing on said registration surface and having a cylindrical region in which said unitary jaw retains a fixed diameter within a final approach of said lip regions toward said disk residing on said registration surface; and
a cap fixed to said unitary jaw, said cap including symmetrically arranged fingers which are perpendicular to said registration surface.

* * * * *